May 19, 1970  KENSEI SUZUKI ETAL  3,512,243
METHOD AND DEVICE FOR SEALING GAS UNDER HIGH PRESSURE
INTO A GAS-SEALED TYPE SHOCK ABSORBER
Filed Oct. 24, 1967  3 Sheets-Sheet 1
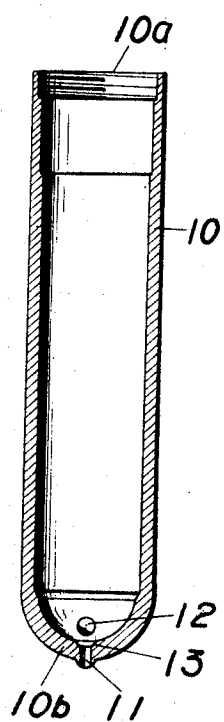
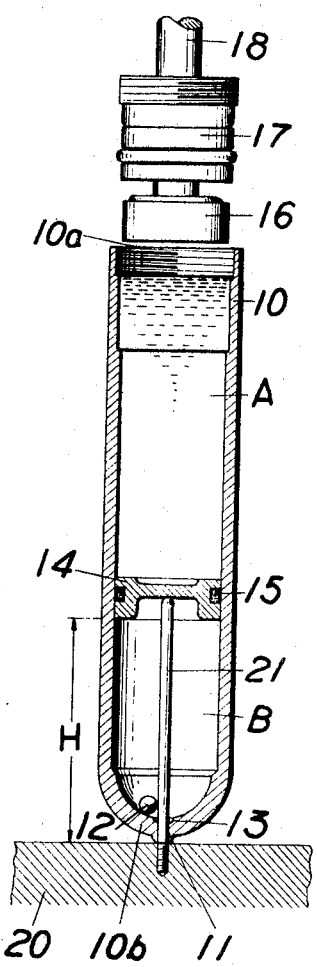
INVENTORS
Kensei Suzuki
Kiyoshi Ando
BY Katsuyoshi Kishi
Jecies and Greenside May 19, 1970  KENSEI SUZUKI ETAL  3,512,243
METHOD AND DEVICE FOR SEALING GAS UNDER HIGH PRESSURE
INTO A GAS-SEALED TYPE SHOCK ABSORBER
Filed Oct. 24, 1967  3 Sheets-Sheet 3
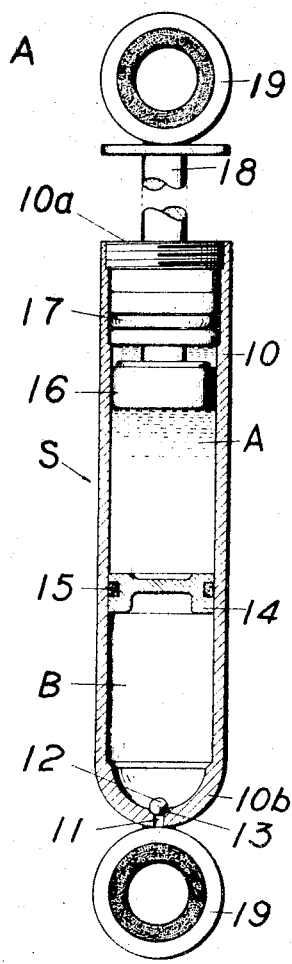
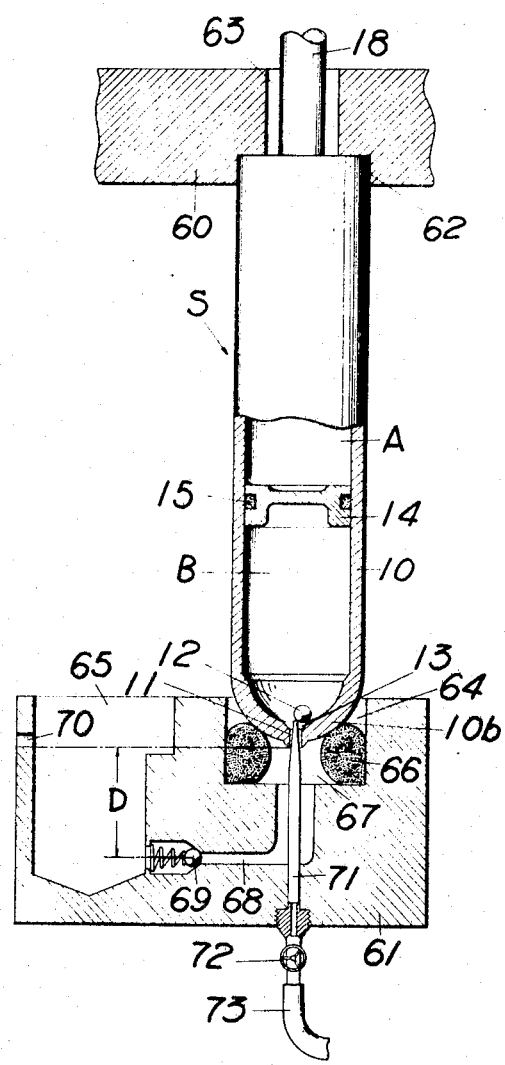
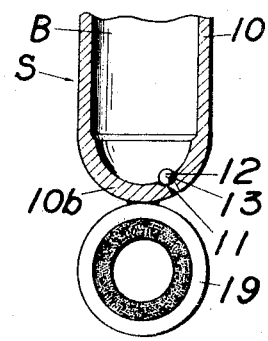
INVENTORS
Kensei Suzuki
Kiyoshi Ando
BY Katsuyoshi Kishi
Jacces and Greenside United States Patent Office 3,512,243
Patented May 19, 1970

3,512,243
METHOD AND DEVICE FOR SEALING GAS UNDER HIGH PRESSURE INTO A GAS-SEALED TYPE SHOCK ABSORBER
Kensei Suzuki, Kiyoshi Ando, and Katsuyoshi Kishi, Kani-gun, Gifu-ken, Japan, assignors to Kayabakogyo Kabushikikaisha, Tokyo-to, Japan, a corporation of Japan
Filed Oct. 24, 1967, Ser. No. 677,622
Claims priority, application Japan, Nov. 9, 1966, 41/73,230; Nov. 11, 1966, 41/73,821
Int. Cl. B21d 21/00; B23p 19/04; B65b 31/02
U.S. Cl. 29—434
18 Claims

ABSTRACT OF THE DISCLOSURE

In a gas-sealed shock absorber of the type wherein an actuating cylinder is divided into an oil chamber and a gas chamber by means of a free piston, this invention relates to a method and a device for sealing gas under high pressure into said gas chamber. In order to fill and seal the gas under high pressure into the gas chamber after and in this state that said free piston is positioned at a predetermined position within the actuating cylinder, at the closed end of the actuating cylinder there is provided an aperture for introducing the gas, and a blocking or closing valve is disposed at the end of the actuating cylinder for sealing tightly the filling aperture; the free piston is positioned at a predetermined position within the actuating cylinder; thereafter the oil is filled into the oil chamber defined within the actuating cylinder and an assembly is mounted in the actuating cylinder; and after filling the gas under high pressure into the gas chamber through the aperture whilst keeping the valve open. The valve is closed by the back pressure of the gas within the gas chamber upon termination of the gas filling procedure.

BACKGROUND OF THE INVENTION

This invention relates to a method and a device for sealing gas under high pressure into a gas chamber of oleo-pneumatic shock absorber or a shock absorber combined with a solid spring for various uses, such as for a bicycle.

In an oleo-pneumatic shock absorber, the piston is immersed in the oil within the oil chamber of the actuating cylinder and the change in volume or space within the actuating cylinder caused by the reciprocation of the actuating piston is compensated by the gas chamber. The piston is adapted to allow flow of oil from the oil chamber into the gas chamber through a damping valve or damping bore to thereby give resistance to the flow of the oil so as to produce damping force. At the same time, the pressure change within the gas chamber caused by the reciprocal motion of the piston provides the air spring effect.

Therefore, in order to maximize the efficiency of the damping action and the suspension action to the full and to obtain a product having a uniform performance, care must be taken so that, in filling a metered amount of air is introduced and that no air or the like is mixed into the oil filled within the oil chamber and that the free piston which partitions the oil chamber and the gas chamber is positioned at a correct distance, upon filling the gas having a predetermined high pressure into the gas chamber, the volume and the pressure of the gas should be maintained at a predetermined value. In case of filling the gas under high pressure into the gas chamber, the possibility of mass-production and the cost of the shock absorber greatly depends upon the method employed to fill the gas. A high pressure of the order of from a few to tens atm. in the gas chamber is conventional. A safe manner of filling at a lower cost represents a substantial technical and economic advance.

There has previously been proposed to fill the actuating cylinder with gas under high pressure and thereafter to plug the filling aperture or weld the same so as to close it tightly. However, according to this method, two separate steps have to be performing sequentially; filling the gas under high pressure into the gas chamber and thereafter sealing the filling aperture. The two steps must be accomplished at one location. This method has the disadvantages that the above described two sequential steps take much time and this method is not adapted for a mass-production line.

BRIEF SUMMARY OF THE INVENTION

The present invention is directed to a method of filling the gas space of a shock absorber by first introducing a predetermined amount of liquid into the gas space and thereafter replacing the liquid by a gas which may be air but is preferably substantially nitrogen.

It is an object of this invention to provide a method which will enable shock absorbers having an air spring, particularly oleo-pneumatic shock absorbers, to be filled quickly and in a mass production manner.

It is another object of this invention to provide a method wherein the shock absorber will be automatically sealed after the gas under pressure has been introduced into the shock absorber.

It is a still further object of this invention to provide an arrangement wherein the valve sealing gas space in the shock absorber will be automatically opened before the gas is introduced and will be automatically closed at the termination of said gas filling procedure.

The valve as illustrated is shown as located at the lower end of the cylinder. Other locations can also be utilized.

The above and other objects, features, advantages and functions of this invention will become apparent from the following description, taken in conjunction with the accompanying drawings, in which preferred embodiments are illustrated by way of example.

BRIEF EXPLANATION OF DRAWINGS

FIG. 1 is a longitudinal sectional plan view of an actuating cylinder to be utilized in this invention;

FIG. 2 is a longitudinal sectional plan view showing that by means of a jig bar having a predetermined length a free piston is locked mechanically and held in position;

FIG. 5 is a longitudinal sectional plan view showing the operation of replacing the fluid within the gas chamber defined by the free piston with a gas under pressure; and FIG. 6A is a longitudinal sectional plan view illustrating a gas-sealed type absorber accomplished by the present invention; and FIG. 6B is a modification.

DETAILED DESCRIPTION OF PREFERRED EMBODIMENTS OF THE INVENTION

Figure 3:
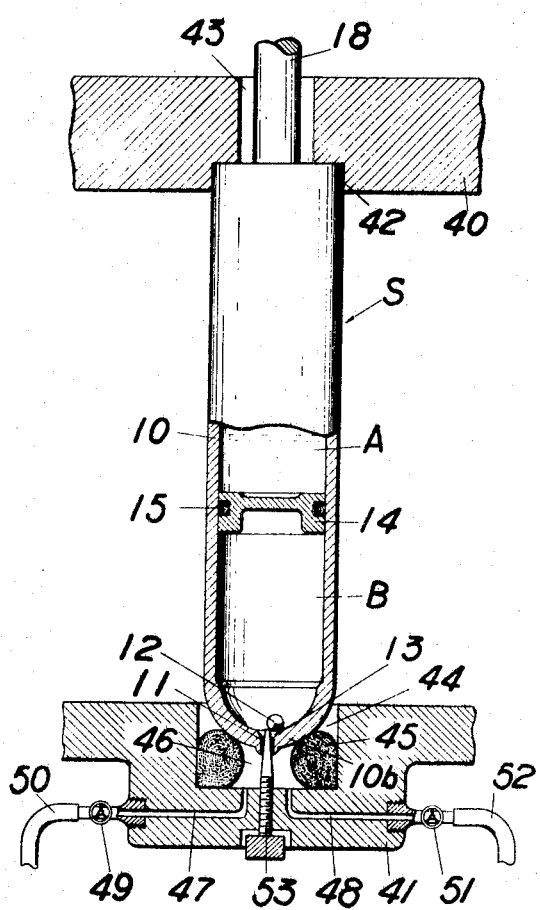
FIG. 3 is a longitudinal sectional plan view showing the operation of filling gas under pressure into a gas chamber defined within the actuating cylinder by means of the free piston.

In FIG. 1 there is shown an actuating cylinder 10 the center of its closed end of which is bored to provide a filling opening 11. A blocking or closing ball 12 is disposed within the actuating cylinder 10. A recess 13 in the form of, for example, a semisphere is provided in the peripheral surface of the inner wall of the actuating cylinder 10 so as to surround the filling opening 11 and to facilitate the blocking or closing ball 12 to roll down into the recess 13. Therefore, when the actuating cylinder 10 is assembled with its closed end directed downwardly, the blocking or closing ball 12 naturally rolls down by gravity into the recess 13 so that the filling opening 11 is closed. The blocking or closing ball 12 may be made of a metal, but it is preferable to make this blocking or closing ball 12 of an elastic substance such as rubber, synthetic resin, etc. in order to ensure the air-tightness when the blocking ball 12 closes the filling opening 11 and also to prevent the noise caused by the blocking or closing ball 12 when it rolls down.

According to the present invention, the actuating cylinder 10 arranged and disposed as described hereinbefore is assembled into a gas-sealed type shock absorber S shown in FIG. 6. In assembly steps, first the actuating cylinder 10 is partitioned into an oil chamber A and a gas chamber B by means of a free piston 14. The damping aperture and the damping valve on the working piston 16 have been omitted for clarity's sake. That is, the free piston 14 is fitted into the actuating cylinder 10 from the upper opening 10a thereof toward the vicinity of the lower closed end bottom portion 10b, so that a seal packing 15 fitted around the outer periphery of the free piston 14 partitions the actuating cylinder 10 into the gas chamber B and the oil chamber A.

Thereafter, a positioning stand 20 from which a jig bar 21 is extending uprightly as shown in FIG. 2 is employed so that the jig bar 21 is fitted into the filling opening 11 directed downwardly. When the actuating cylinder 10 is made to move downwardly until the closed bottom portion 10b of the actuating cylinder 10 contacts with the positioning stand 20, the position of the free piston 14 is correctly determined at the height of H corresponding to the length of the jig bar 21 from the closed bottom portion 10b of the actuating cylinder 10, so that the gas chamber B always has a predetermined volume. Alternatively, the desired similar result can be obtained by first fitting the jig bar 21 into the filling opening 11 of the actuating cylinder 10, pushing down the actuating cylinder 10 until its closed bottom portion 10b contacts with the positioning stand 20, and thereafter fitting the free piston 14 from the opening 10a of the actuating cylinder 10 until the free piston 14 contacts with the upper end of the jig bar 21.

Next, in the state wherein the free piston 14 is correctly positioned by means of the jig bar 21, the actuating or working oil is filled from the upper 10a of the actuating cylinder 10 into the oil chamber A. Thereafter, the assembly of an actuating piston 16, a bearing 17, etc. is fitted into the oil chamber A with a sufficient care so that no air and the like is mixed into the oil, and then the assembly is held in position. Next, the actuating cylinder 10 is moved upwardly of the positioning stand 20 so as to withdraw the jig bar 21 through the opening 11. In this case, the position of the free piston 14 remains unchanged even though the jig bar 21 is not supporting the free piston 14 because the oil chamber A in which the working or actuating oil is filled is sealed. Thus, the free piston 14 remains at the predetermined position determined by the jig bar 21 so that the volume or space of the gas chamber A is maintained at a predetermined volume.

As described above, when the position of the free piston 14 within the actuating cylinder 10 is determined by means of the jig bar 21 which is fitted through the filling opening 11 bored through the closed bottom portion 20 of the actuating cylinder 10, it is impossible to minimize the diameter of the filling opening 11 less than a certain degree. The reason is that because the jig bar 21 is used to be fitted through the filling opening 11 into the actuating cylinder 10 so as to determine the position of the free piston 14 within the actuating cylinder 10, the diameter of the jig bar 21 is naturally limited to a certain diameter for a practical purpose so that the diameter of the filling opening 11 is naturally limited in practice by the diameter of the jig bar 21, that is the diameter of the filling opening 11 must be larger than that of the jig bar 21.

Therefore, when the filling opening 11 is closed by, for example, welding and if the strength of the joint is desired strictly to be maintained at a certain magnitude, then the undesirable or objectionable result is produced because the filling opening 11 is too big.

In view of the above, it is preferable to determine the position of the free piston 14 by a fluid lock method, which will be hereinafter described in more detail.

Figure 4:
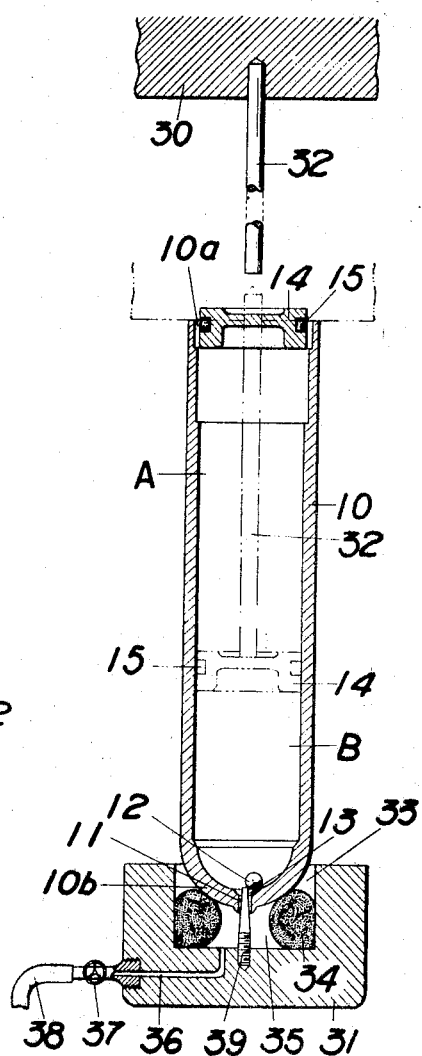
FIG. 4 is a longitudinal sectional view of one modification of the present invention showing that a free piston is under control of a fluid and by means of a jig bar having a predetermined length the free piston is held in position.

First the actuating cylinder 10 is made to stand uprightly with its filling opening 11 directing downwardly and then a suitable liquid such as water, oil, etc. is filled from the opening 10a into the actuating cylinder 10. In this case, the blocking or closing ball 12 disposed within the actuating cylinder 10 rolls down into the recess 13, thereby closing the opening 11. Therefore, the liquid which is filled into the actuating cylinder 11 is not permitted to leak through the filling opening 11. Next, as best shown in FIG. 4, the free piston 14 is fitted into the opening 10a of the actuating cylinder 10, and then the actuating cylinder 10 carrying thus fitted free piston 14 is placed in a positioning device comprising of an upper jig 30 and a lower jig 31. The upper and lower jigs 30 and 31 of the positioning device are adapted to be displaced vertically with respect to each other by a mechanical, hydraulic or pneumatic device. The upper jig 30 is only provided with a jig bar 32 of a predetermined length which is adapted to push down the free piston 14 into the actuating cylinder 10 whereas the lower jig 31 has a cavity or recess 33 for receiving the lower end portion of the actuating cylinder 10. At the bottom of the cavity 33 there are disposed ring-like seal packings 34, which in turn define a chamber 35 at the center of the cavity 33. A passage 36 is bored through the lower jig 31 and communicating with the chamber 35. This passage 36 is communicated with a tank (not shown) through a piping 38 and a valve 37 interposed between the passage and the piping. A needle rod 39 is extending uprightly from the bottom of the chamber 35 and has a smaller diameter than that of the filling opening 11 so that when the tip end of the needle rod 39 is fitted into the filling opening 11 of the actuating cylinder 10 the gap or space may be provided between the opening 11 and the needle rod 39.

Thus, when the liquid is first filled into the actuating cylinder 10 and the lower end of the actuating cylinder 10 with the free piston 14 fitted in the upper opening is forced into the cavity 33 and against the seal packing 34, the top end of the needle rod 39 projects slightly beyond the filling opening 11 of the actuating cylinder 10, so that the blocking or closing ball 12 is pushed upwardly, thereby communicating the inside of the actuating cylinder 10 with the chamber 35 through a gap or space between the filling opening 11 and the needle rod 39. Now, when the upper and lower jigs 30 and 31 are caused to come close together so as to force the free piston 14 into the actuating cylinder 10 by means of the jig bar 32 of the upper jig 30 and at the same time open the valve 37, then the liquid filled within the actuating cylinder 10 is directed to flow into the tank through the gap or space between the filling opening 11 and the needle rod 39, the chamber 35, the passage 36 and the piping 38. When the free piston 14 is further advanced into the actuating cylinder 10 and finally when the upper jig 30 abuts against the upper end of the actuating cylinder 10 and is stopped, the free piston is held in the predetermined position determined by the length of the jig bar 32 as shown by the chain line in FIG. 4 and the actuating cylinder 10 is divided into the oil chamber A and the gas chamber B, each having the predetermined volume or space, by means of the seal packing 15 fitted around the periphery of the free piston 14.

Next the valve 37 is closed and the upper and lower jigs 30 and 31 are caused to move vertically so as to be spaced apart further from each other so as to withdraw the jig bar 32 of the upper jig 30 from the actuating cylinder 10. Thereafter, the actuating cylinder 10 is pulled out of the cavity 33 of the lower jig 31. Then, in this state, the oil chamber A of the actuating cylinder 10 is empty whereas the gas chamber B is filled with the liquid. Therefore, the liquid contained within the gas chamber B tends to flow out through the filling opening 11, but is actually prevented from flowing out of the actuating cylinder 10 because as soon as the actuating cylinder 10 has been lifted up from the cavity 33 of the lower jig 31, the needle rod 39 is withdrawn from the filling opening 11 to thereby permit the blocking or closing ball 12 to roll down into the recess 13 to close the filling opening 11, that is the liquid contained within the gas chamber B is locked.

Next, the actuating or working liquid is filled sufficiently into the oil chamber A from the upper opening 10a of the actuating cylinder 10, and thereafter the assembly of the actuating piston 16, the bearing 17, etc. is mounted into the actuating cylinder 10 with a sufficient care so that no air or the like is mixed into the oil in the oil chamber A. In this case, when the working oil is filled into the oil chamber A and the assembly is mounted, the free piston 14 is exerted with the force which forces the free piston 14 toward the gas chamber B. However, in practice the free piston 14 is prevented from moving because it is locked by the liquid contained within the gas chamber B so that the volume or space of the gas chamber B is maintained at a predetermined volume.

The next step is to fill a gas under high pressure into the gas chamber B of the shock absorber S in which, as described in detail hereinbefore, the free piston 14 and the assembly of the actuating piston 16, the bearing 17, etc. are mounted in position and the actuating or working liquid is filled in the oil chamber A. In this case, air is filled in the gas chamber B when the free piston 14 is held in the predetermined position by the mechanical method in which the jig bar 21 is inserted through the filling opening 11 into the actuating cylinder 10. On the other hand, when the free piston 14 is held in the predetermined position by the liquid lock method described above in which water, oil or the like is used for positioning the free piston 14, the liquid such as water, oil or the like is filled within the gas chamber B. Therefore, when the gas under high pressure is filled into the gas chamber B, a device shown in FIG. 3 is employed in case of the mechanical method whereas in case of the liquid lock method a device shown in FIG. 5 is used.

First, the device shown in FIG. 3 will be described which is adapted to fill the gas under high pressure into the gas chamber B of the shock absorber S in which the position of the free piston 14 is determined by the above described mechanical method. As is clearly understood from FIG. 3, this device is comprising the oppositely disposed upper and lower jigs 40 and 41 which are adapted to vertically move close toward or away from each other by any suitable mechanism such as mechanical, hydraulic or pneumatic mechanism. The upper jig 40 is provided with a recess 42 for receiving and holding in position the upper end portion of the actuating cylinder 10 of the shock absorbers and a bore 43 into which is inserted a piston rod 18 carrying the actuating piston 16 whereas the lower jig 41 is provided with a cavity or recess 44 for receiving and holding in position the lower end portion of the actuating cylinder 10. Ring-like seal packings 45 are disposed at the bottom of the cavity 44 and define a chamber 46 at the center portion of the cavity 44. Furthermore, the lower jig 41 is provided with two passages 47 and 48 which are communicated with the chamber 46 respectively. One, 47, of the passages is communicated with a vacuum pump (not shown) through a valve 49 and a piping 50 whereas the other, 48, of the passages a supply source of gas under pressure (not shown) through a valve 51 and a piping 52. It is preferable that this supply source of gas under pressure be an inert gas such as nitrogen gas. A needle rod 53 of the lower jig 41 which is extending through the chamber 46 is reciprocably threadably engaged with the lower jig 41. This needle rod 53 has a diameter smaller than that of the filling opening 11 so as to provide a gap or space therebetween when the tip end of the needle rod 53 is fitted into the filling opening 11 of the actuating cylinder 10. The shock absorber S in which the free piston 14, the assembly of the actuating piston 16, the bearing 17, etc. are assembled in the previous steps as described above is placed in the device for filling the gas under high pressure. For example, the shock absorber S with its filling opening 11 directed downwardly is placed in the device in such a manner that the upper end portion of the shock absorber S is fitted into the cavity 42 of the upper jig 40 and thereafter the lower jig 41 is moved upwardly by means of a mechanical, hydraulic or pneumatic mechanism so that the lower end of the shock absorber S is fitted into and pressed against the cavity of recess 44 of the lower jig 41. Then, as best shown in FIG. 3, the lower end surface of the shock absorber S is pressed against the seal packings 45 disposed within the cavity 44 so that the chamber 46 is prevented from communicating with the outside. At the same time, the tip end of the needle rod 53 projects slightly beyond the upper periphery of the filling opening 11 of the shock absorber S into the gas chamber B so that the blocking or closing ball 12 disposed therein is caused to be pushed upwardly, to thereby permit the communication between the gas chamber B with the chamber 46 defined in the lower jig 41 through the gap or space between the filling opening 11 and the needle rod 53. It will be clearly understood to those skilled in the art that the upper jig 40 or both of the upper and lower jigs are made movable; the shock absorber S may be first fitted into the cavity 42 of the upper jig 40 or into the cavity 44 of the lower jig 41. The above and other alternations can be freely selected as demands need in actual operation.

When the valve 49 disposed at the lower jig 41 is opened, the chamber 46 within the lower jig 41 is permitted to communicate with the vacuum pump through the passage 47 and the piping 50, so that the air in the gas chamber B of the shock absorber S is permitted to flow out of the actuating cylinder 10 by means of the vacuum pump through the gap or space between the filling opening 11 and the needle rod 53. After exhausting the air within the gas chamber B, the valve 49 is closed and the valve 51 is opened so that the gas under high pressure may be supplied into the gas chamber B of the shock absorber S from the supply source of gas under high pressure through the piping 52, the passage 48, the chamber 46 and the gap or space between the filling opening 11 and the needle rod 53. In order to maintain at a predetermined pressure level the gas under high pressure filled in the gas chamber B, it is sufficient enough to set the supply pressure of the gas from the supply source to a predetermined pressure level or to interpose a monometer in the passage 48 or the piping 52 so as to close the valve 51 as soon as the pressure indicated by this monometer reaches a predetermined pressure.

In the above description, the air within the gas chamber B of the shock absorber S is exhausted by means of a vacuum pump prior to the introduction of the gas other than air. However, about 80% of the air is nitrogen, so that it is not necessarily required to exhaust the air within the gas chamber B by means of a vacuum pump. That is the circuit comprising of the passage 47, the valve 49, the piping 50 and the vacuum pump shown in FIG. 3 may be eliminated. In this case, the valve 51 is immediately opened, even though the gas chamber B is still filled with the air, so as to supply into the gas chamber B the nitrogen gas under high pressure. Since the supply of the nitrogen gas is continued until the pressure thereof reaches the order of from 25 to 30 atm., the gas chamber B is filled almost with nitrogen gas and the ratio of nitrogen gas to other gas such as oxygen, carbon dioxide gas, etc. becomes negligible so that in practice such a nitrogen gas filling method produces no inconvenience or objection and is utilized practically. As described hereinbefore, it is preferable to exhaust the air within the gas chamber B by means of a vacuum pump prior to the introduction of nitrogen gas, but it is not necessarily required to do so in view of the practical use.

After closing the valve 51, the upper and lower jigs 40 and 41 are caused to move away from each other while the shock absorber S is held for example by the hand so as to permit immediate disengagement of the shock absorber S from the lower jig 41. Then, the needle rod 53 is withdrawn from the filling opening 11 and the blocking or closing ball 12 is caused to roll down by gravity and to be tightly pressed against the filling opening 11 by the back pressure of the gas within the gas chamber B, whereby the leakage of the gas from the gas chamber B is prevented or sealed. As described hereinbefore, the introduction of the gas under high pressure into the gas chamber B of the shock absorber S and the sealing of the filling opening 11 are automatically accomplished in a short time.

Next, the description is hereinafter made regarding to the device which is utilized to replace with the gas under high pressure, the liquid contained within the gas chamber B of the shock absorber S when the free piston 14 is held in the predetermined position by the liquid lock method. As best shown in FIG. 5, this device is comprising an upper jig 60 and a lower jig 61 both of which are adapted to move vertically toward or away from each other by means of a mechanical, hydraulic or pneumatic mechanism. The upper jig 60 is provided with a cavity 62 for receiving and holding in position of the actuating cylinder 10 of the shock absorber S and a bore 63 through which extends a piston rod 18 carrying the actuating piston 16 while the lower jig 61 is provided with the cavity or recess 64 for receiving and holding in position the actuating cylinder 10 and a reservoir 65. At the bottom of the cavity 64 there are disposed ring-like seal packings 66 which define a chamber 67 at the center of the cavity 64. This chamber 67 is communicated with the lower portion of the reservoir 65 through a passage 68 bored through the lower jig 61 and a relief valve 69. The reservoir 65 is provided with an overflow 70 communicating with a tank (not shown). Furthermore, the lower jig 61 is provided therein with a supply pipe which extends into the chamber 67 for supplying the gas under high pressure. The diameter of this supply pipe 71 is made smaller than that of the filling opening 11 of the actuating cylinder 10, so that when the pipe 71 is fitted into the filling opening 11 there may be provided a gap or space therebetween. The lower end portion of this supply pipe 71 is communicated with a supply source of the gas under pressure (not shown) through a valve 72 and a piping 73.

To the device arranged and disposed as described above is placed a shock absorber S in which the free piston 14, the assembly of the actuating piston 16, the bearing 17, etc. were already assembled and disposed in the previous steps. In this case, the filling opening 11 is directed downwardly and the lower portion of the shock absorber S is fitted into the cavity 64 of the lower jig 61 and is pressed against the seal packings 66. Then, as best shown in FIG. 5, the lower end surface of the shock absorber S covers the upper portion of the chamber 67 so that the communication of the chamber 67 with the outside is prevented. At the same time, the tip end of the supply pipe 71 projects slightly beyond the filling opening 11 of the shock absorber S into the gas chamber B, so that the blocking or closing ball 12 disposed within the actuating cylinder 10 is pushed upwardly to thereby permit the communication between the gas chamber B and the chamber 67 through the gap or space between the filling opening 11 and the supply pipe 71.

When the valve 72 is opened, then the gas under high pressure is supplied into the gas chamber B through the supply pipe 71 from the supply source. In this case, when the supply pressure P of the gas under high pressure is made higher than the cracking pressure $P_1$ of the relief valve 69, the liquid contained within the gas chamber B causes the relief valve 69 to open and is directed to flow into the reservoir 65 through the gap or space between the filling opening 11 and the supply pipe 71, the chamber 67 and the passage 68 by the gas under high pressure supplied into the gas chamber B from the supply pipe 71. At the same time, the liquid stored in the reservoir 65 is directed to flow into the tank through the overflow bore 70. Into this reservoir 65 flows the liquid from the gas chamber B of the shock absorber S, but the liquid in the same quantity with that of the liquid flown into the reservoir is directed to return to the tank through the overflow bore 70 from the reservoir 65 so that the depth D from the free surface of the reservoir 65 to the relief valve 69 remains unchanged all the time. Consequently, the cracking pressure $P_r$ also remains unchanged.

Thus, the liquid contained within the gas chamber B of the shock absorber S is replaced by the gas under high pressure supplied from the supply pipe 71 and finally the gas under high pressure emerges into the reservoir 65 in the form of bubbles. At this moment, the valve 72 is closed. Then, the gas pressure within the gas chamber B decreases from the supply pressure P to the cracking pressure $P_1$ of the relief valve 69 so that when the cracking pressure $P_1$ of the relief valve 69 is predetermined at a desired pressure of the gas supplied into the gas chamber B, the liquid within the gas chamber B is completely replaced with the gas having a predetermined pressure.

When the upper and lower jigs 60 and 61 are caused to be spaced apart from each other and the shock absorber S is immediately taken off from the cavity 64 of the lower jig 61, then the supply pipe 71 is withdrawn from the filling opening 11 and the blocking or closing ball 12 rolls down into the recess 13 by gravity and is firmly pressed against the filling opening 11 by the back pressure of the gas within the gas chamber B, whereby the leakage of the gas from the gas chamber B is prevented or sealed. Thus, the introduction of the gas under high pressure into the gas chamber B of the shock absorber S and the sealing operation of the filling opening 11 are automatically accomplished in a short time.

In the embodiments of the present invention described hereinbefore, the filling opening 11 communicating with the gas chamber B is provided coaxially of the actuating cylinder 10 at the closed bottom portion 10b thereof. However, when the extensive study is made regarding to the sealing characteristics of the blocking or closing ball 12, the size or dimension and the material thereof are suitably selected and the designing of the ball 12 is made with due consideration regarding to the shapes of the filling opening 11 and the recess 13 surrounding this opening, the state or condition in which the blocking or closing ball 12 keeps closing the filling opening by the backpressure of the gas within the gas chamber B is sufficiently practically utilized. When the blocking or closing ball 12 acts just as described above, it is not necessarily required to provide the filling opening 11 coaxially of the actuating cylinder 10 at the closed bottom end portion 10b thereof. For example, the filling opening 11 may be provided at a position shown in FIG. 6B. Briefly, the design is made in any suitable way as long as the filling opening 11 is communicated with the gas chamber B and the blocking or closing ball 12 is adapted to automatically roll down by gravity toward the filling opening 11 so as to close tightly this opening 11.

A ball type valve is described and illustrated. Any other type of valve may be used such as a poppet valve. Additionally, the valve is shown as weight biased. A spring biased valve may also be used.

The preferred arrangement describes the permanent closing of the gas filling aperture, by plugging or welding after the shock absorber has been removed from the filling rig. Hand operated screwdown valve for semipermanently closing the filling aperture may also be used. The step of permanently closing the gas aperture is not an essential one. The gas filling aperture may be left sealed by the valve alone. This may be desirable if the characteristics of the shock absorber are to be changed from time to time. Such change of characteristic may be accomplished by either reducing the gas pressure due to bleed off; or increasing the gas pressure by introducing additional gas under pressure.

As needs demand, after filling into the gas chamber B the gas under high pressure, a plug may be inserted into the filling opening 11 or this plug may be welded so as to close the filling opening 11. In this case, it is a common practice to provide an eyehook 19 or end bolt at one end of the actuating cylinder 10. Therefore, when the filling opening 11 is provided along the axial line of the actuating cylinder 10, the filling opening 11 may be closed by the eyehook 19 or the like in the last step of welding the eyehook or the like to the end of the actuating cylinder 10. In this case, the plug or the like is not required and the filling opening 11 may be semipermanently closed in the same welding work of the eyehook 19 or the like. Thus, the gas-sealed type shock absorber S shown in FIG. 6A is provided.

In view of the above, the blocking or clossing ball 12 is utilized only for a short time that is from the time when the gas is filled until the step of closing the filling opening 11 by a plug or the step of welding the eyehook or the like 19 in order to prevent the leakage of the gas. Therefore, the blocking or closing ball 12 is not demanded to have a good durability. When this blocking ball 12 is used, the operation of plugging the plug or the like into the opening 11 or the welding operation of the eyehook or the like 19 may require no specific jigs and may be accomplished in the atmosphere under the free conditions in a simple manner. Thus, the filling opening closed by plugging or welding the plug or welding the eyehook or the like 19 is semi-permanently sealed tightly so that there will be no fear of leakage.

Thus, according to the present invention, through simple manufacturing steps the assembly of the gas sealed type shock absorber can be accomplished in good order. This is one of the best advantages of the present invention in view of the mass production of the gas-sealed type shock absorber of the type described in the assembly-line. As specifically described hereinbefore, filling of the actuating or working oil into the oil chamber A and filling of the gas under high pressure into the gas chamber B can be effected while the free piston 14 is always held in the predetermined position, so that the product has always a stabilized quality. Furthermore, the productivity in the mass-production of the gas-sealed type shock absorber can be remarkably improved because the filling opening 11 can be semi-permanently closed by plugging or welding a plug or welding the eyehook or the like 19 as demands needs and any of these closing steps can be accomplished in the atmosphere under free conditions.

The shock absorber of the present invention is a conventional oleo-pneumatic shock absorber except for the method of determining the volume of the gas space and the method of sealing. Such oleo-pneumatic shock absorbers comprise a gas space and an oil space, which may be separated by a floating piston. A working piston with a piston rod attached to it is adapted to reciprocate in the oil space. Apertures, some of them valved, are located in the working pistons in order to provide for the damping action. The gas will be compressed upon application of a load and will act as a restoring spring. The details of the shock absorber and its mode of operation do not require detailed description, since they are well known.

The essential features of the present invention have been described in this specification with reference to the embodiments of the invention disclosed by way of example, and it will be appreciated by those skilled in the art that variations, alternations and/or modifications may be resorted to without departing from the spirit and principle of the present invention. Therefore, it is to be understood that the variations, alternations and/or modifications which enable to attain substantially same/or similar/ effects with those attained by the use of a device substantially in the scope of the present invention shall fall within the spirit and scope of the invention as recited in the following claims.

What is claimed is:

1. A method for sealing gas under pressure into a gas-sealed type shock absorber comprising employing an actuating cylinder the closed end of which is bored to provide a filling opening and into which is disposed a blocking or closing ball, holding in a predetermined position within said actuating cylinder a free piston by means of a jig bar of a predetermined length while said blocking or closing ball is pushed upwardly by means of said jig bar from the exterior of said actuating cylinder through said filling opening, mounting as assembly in said actuating cylinder after filling sufficiently the oil into an oil chamber defined within said actuating cylinder, filling the gas under high pressure into a gas chamber defined within said actuating cylinder through said filling opening, and opening said filling opening to the atmosphere after said gas under high pressure reaches a predetermined pressure level so as to press said blocking or closing ball against said opening by the back pressure of said gas within said gas chamber to thereby close said filling opening by said blocking or closing ball.

2. A method according to claim 1, wherein said jig bar of a predetermined length is fitted from the exterior of said actuating cylinder through said filling opening so as to push upwardly said blocking or closing ball within said actuating cylinder and to position said free piston at the predetermined position within said actuating cylinder.

3. A method according to claim 2, wherein after said free piston is held in said predetermined position within said actuating cylinder by said jig bar of a predetermined length inserted into said actuating cylinder through said filling opening and in this state, said oil is filled into said oil chamber defined within said actuating cylinder, and said free piston is locked at said predetermined position by mounting said assembly in said actuating cylinder.

4. A method according to claim 3, wherein after filling said oil into said oil chamber defined within said actuating cylinder and mounting said assembly in said actuating cylinder, a needle rod inserted from the exterior of said actuating cylinder through said filling opening pushes upwardly said blocking or closing ball so as to communicate said gas chamber within said actuating cylinder with a supply source of said gas under pressure and to introduce said gas under high pressure into said gas chamber.

5. A method according to claim 4, wherein before said gas chamber is communicated with said supply source, said gas chamber is communicated with a vacuum pump so as to exhaust the air within said gas chamber, and thereafter said gas chamber is communicated with said supply source so as to introduce said gas under high pressure into said gas chamber.

6. A method according to claim 1 further comprising fitting said free piston into the opening of said actuating cylinder after filling the liquid such as water, oil or the like into said actuating cylinder, and inserting a jig bar of a predetermined length from said opening into said actuating cylinder so as to push downwardly said free piston within said actuating cylinder while pushing up said blocking or closing ball by means of a needle rod inserted through said filling opening, tnereby positioning said free piston at a predetermined position by means of said jig bar of a predetermined length.

7. A method according to claim 6, wherein after positioning said free piston at said predetermined position by inserting said jig bar of a predetermined length, into said actuating cylinder from said opening, the fitting engagement of said needle rod with said filling opening is released so as to engage said blocking or closing ball with said filling opening, in the state described above oil is filled into said oil chamber of said actuating cylinder, and said assembly is mounted so as to lock said free piston at said predetermined position.

8. A method according to claim 7, wherein after filling said oil into said oil chamber and mounting said assembly into said actuating cylinder, a gas chamber defined within said actuating cylinder is made to communicate with said supply source of said gas under high pressure while said needle rod inserted from the exterior of said actuating cylinder through said filling opening pushes said blocking or closing ball upwardly, thereby replacing a liquid within said gas chamber with said gas under high pressure.

9. A method according to claim 4 wherein a recess is formed in the inner wall of said actuating cylinder around said filling opening bored through said closed end of said actuating cylinder, and after introducing said gas under high pressure into said gas chamber through said filling opening, said blocking or closing ball disposed within said actuating cylinder is caused by gravity to roll down into said recess so that said blocking or closing ball automatically closes said filling opening by said back pressure of said gas within said gas chamber.

10. A device for use in sealing gas under high pressure into a gas-sealed type shock absorber comprising an actuating cylinder, the closed end of which is bored to provide a filling opening and into which is disposed a blocking or closing ball for closing said filling opening, positioning means having a jig bar of a predetermined length for positioning a free piston fitted into said actuating cylinder at a predetermined position, a pair of upper and lower jigs adapted to hold in position said actuating cylinder therebetween, and a gas under high pressure filling means to introduce gas under high pressure into a gas chamber defined within said actuating cylinder through said filling opening and a chamber defined by seal packings interposed within a cavity provided in said lower jig and by said actuating cylinder pressed against said seal packings.

11. A device according to claim 10, wherein said device is provided with a positioning means having a jig bar of a predetermined length to be inserted into said actuating cylinder through said filling opening so as to position said free piston fitted into said actuating cylinder at a predetermined position.

12. A device according to claim 11, wherein said device is provided with a gas under high pressure filling means which has within a chamber defined in said lower jig by said seal packings and said actuating cylinder pressed against said seal packing a needle rod extending through and beyond said filling opening into said cylinder so as to push said blocking or closing ball upwardly and a passage for communicating said chamber with a gas under high pressure supply source through a valve.

13. A device according to claim 12, wherein in addition to said passage for communicating said gas under high pressure supply source to said chamber defined in said lower jig by said seal packings and said actuating cylinder pressed against said seal packings, another passage is provided for communicating said chamber with a vacuum pump through a valve.

14. A device according to claim 10, wherein said device is provided with a positioning means comprising an upper jig provided with a jig bar of a predetermined length to be inserted into said actuating cylinder through said opening thereof for positioning at a predetermined position said free piston fitted into said actuating cylinder, and a lower jig provided with a cavity or recess for receiving and holding in position the lower end of said actuating cylinder and a needle rod disposed in a chamber defined in said lower jig by seal packings interposed in said cavity and by said actuating cylinder pressed against staid seal packings, said needle rod being adapted to extend through said filling opening into said actuating cylinder so as to push said blocking or closing ball upwardly.

15. A device according to claim 14, wherein said device is provided with a gas under high pressure filling means which is provided with a supply pipe which is disposed within said chamber in said lower jig defined by said seal packings, said needle rod being adapted to ex- against said seal packings, and extends into said actuating cylinder through said filling opening, the lower end of said supply pipe being communicated with said gas under pressure supply source through a valve; and in which said chamber is communicated with a reservoir disposed at one side of said lower jig through a relief valve.

16. A method of assembling a shock absorber which includes a cylinder with a free piston slidingly mounted therein, a valved gas inlet aperture located at one end of said cylinder and an oil inlet opening located at the other end of said cylinder, the free piston adapted to divide the cylinder into a gas space and an oil space comprising the steps of holding means for holding said free piston in a predetermined position, introducing a predetermined amount of liquid into said gas space while keeping said valved gas inlet open, allowing said valved gas inlet to be closed, introducing oil into said oil space of the cylinder, introducing a working piston into the other end of said cylinder and closing said oil inlet opening and replacing the liquid in said gas space by gas under pressure.

17. A method of assembling a shock absorber according to claim 16 wherein the gas replacing the liquid is substantially nitrogen.

18. A method of assembling an oleo-pneumatic shock absorber which includes a cylinder with a free piston mounted therein in a position to divide the cylinder into a liquid space and a gas space, comprising the steps of initially filling said gas space with a liquid of a predetermined amount, holding said free piston in said position defined by the predetermined amount of said initially introduced liquid and thereafter replacing said liquid by gas under pressure, filling said liquid space with a liquid, and closing said shock absorber.

References Cited
UNITED STATES PATENTS

| 2,102,156 | 12/1937 | Payne | 53—88 X |
| 2,196,519 | 4/1940 | Budwig | 29—157 |
| 2,653,683 | 9/1953 | Strauss | 29—422 X |
| 2,882,592 | 4/1959 | Carbon | 29—434 |
| 3,001,268 | 9/1961 | Greer | 29—157 |
| 3,009,243 | 11/1961 | Tutthill | 53—12 X |
| 3,275,023 | 9/1966 | Raspante | 29—157 X |

WAYNE A. MORSE, Jr., Prmary Examiner

U.S. Cl. X.R.

29—157, 469; 53—12, 79; 141—7, 37